US011213925B2

(12) United States Patent
Liu et al.

(10) Patent No.: US 11,213,925 B2
(45) Date of Patent: Jan. 4, 2022

(54) DEVICE FOR REMOVING BURRS FROM RISER OF ALUMINUM ALLOY WHEEL

(71) Applicant: CITIC Dicastal CO., LTD, Qinhuangdao (CN)

(72) Inventors: Huiying Liu, Qinhuangdao (CN); Xinyu Bi, Qinhuangdao (CN); Zhiyuan Yu, Qinhuangdao (CN)

(73) Assignee: CITIC DICASTAL CO., LTD, Hebei (CN)

( * ) Notice: Subject to any disclaimer, the term of this patent is extended or adjusted under 35 U.S.C. 154(b) by 603 days.

(21) Appl. No.: 16/172,120

(22) Filed: Oct. 26, 2018

(65) Prior Publication Data

US 2019/0126424 A1 May 2, 2019

(30) Foreign Application Priority Data

Oct. 31, 2017 (CN) .......................... 201711049081.4

(51) Int. Cl.
*B24B 5/06* (2006.01)
*B24B 5/44* (2006.01)
(Continued)

(52) U.S. Cl.
CPC .............. *B24B 9/04* (2013.01); *B22D 31/002* (2013.01); *B23B 5/28* (2013.01); *B24B 5/06* (2013.01);
(Continued)

(58) Field of Classification Search
CPC .... B24B 5/06; B24B 5/44; B24B 9/00; B24B 9/02; B24B 9/04; B24B 19/26; B24B 19/28; B24B 27/0023; B24B 27/0076; B24B 41/06; B24B 41/067; B24B 49/02; B23B 5/28; B23B 2215/08; B23B 2220/08
(Continued)

(56) References Cited

U.S. PATENT DOCUMENTS 5,161,281 A * 11/1992 Hanen ....................... B08B 1/04
15/88.3
10,232,454 B2 * 3/2019 Liu ....................... B22D 11/126
(Continued)

FOREIGN PATENT DOCUMENTS

CN 205833111 U 12/2016
CN 106938417 A 7/2017
(Continued)

*Primary Examiner* — Eileen P Morgan
(74) *Attorney, Agent, or Firm* — Calfee, Halter & Griswold LLP

(57) ABSTRACT

Disclosed is a device for automatically removing burrs from a riser of an aluminum alloy wheel. The device is composed of a frame, a clamping gear rack structure, a support plate, a servo motor and the like. When a clamping cylinder drives a first sliding plate to move, clamping wheels are controlled to center and clamp the wheel, and the servo motor controls the rotation of the clamping wheels, so that the wheel may rotate while being clamped. When a distance adjusting cylinder drives a second sliding block to move, a first sliding block and the second sliding block move synchronously under the action of a feed gear rack structure, so that a first deburring tool and a second deburring tool move synchronously to adjust the distance between them according to the diameter of a cap slot.

1 Claim, 3 Drawing Sheets

(51) Int. Cl.
*B24B 9/04* (2006.01)
*B24B 19/28* (2006.01)
*B24B 41/06* (2012.01)
*B24B 49/02* (2006.01)
*B23B 9/04* (2006.01)
*B23B 5/28* (2006.01)
*B22D 31/00* (2006.01)
*B24B 27/00* (2006.01)

(52) U.S. Cl.
CPC ............... *B24B 5/44* (2013.01); *B24B 19/28* (2013.01); *B24B 27/0023* (2013.01); *B24B 27/0076* (2013.01); *B24B 41/06* (2013.01); *B24B 49/02* (2013.01); *B23B 2215/08* (2013.01); *B23B 2220/08* (2013.01)

(58) Field of Classification Search
USPC .................................. 451/5, 10, 11, 173, 324
See application file for complete search history.

(56) References Cited

U.S. PATENT DOCUMENTS

| | | | |
|---|---|---|---|
| 2007/0037497 A1* | 2/2007 | Tanaka .................... | B24B 21/02 451/312 |
| 2007/0042678 A1* | 2/2007 | Tanaka .................... | B24B 5/44 451/5 |
| 2007/0044311 A1* | 3/2007 | Tanaka .................... | B21D 53/26 29/894.321 |
| 2014/0194038 A1* | 7/2014 | Lowe ....................... | B24B 9/04 451/11 |
| 2017/0056978 A1* | 3/2017 | Su ........................... | B23Q 3/062 |
| 2019/0224802 A1* | 7/2019 | Liu .......................... | B23D 79/04 |

FOREIGN PATENT DOCUMENTS

| | | |
|---|---|---|
| CN | 107283000 A | 10/2017 |
| EP | 3437769 A1 | 2/2019 |

* cited by examiner

DEVICE FOR REMOVING BURRS FROM RISER OF ALUMINUM ALLOY WHEEL

CROSS-REFERENCE TO RELATED APPLICATIONS

This application claims priority to Chinese Patent Application No. 201711049081.4 filed on Oct. 31, 2017, which is hereby incorporated by reference in its entirety.

TECHNICAL FIELD

The present application relates to the technical field of burr removal after machining of wheels, specifically to a device for removing burrs from a riser of an aluminum alloy wheel.

BACKGROUND ART

The machining accuracy and machining quality of a wheel riser directly affect the installation of a buckle cap. After the wheel is machined, the edge of the riser is synthesized by casting and machining surfaces, so a circle of burrs remain. Currently, the burrs here on the edge of the riser are removed manually, and the effect is not ideal. In addition, the front casting deformation of the riser increases the difficulty of removal, and the deep or shallow groove and the large or small force will cause the burrs at the edge of the riser not to be removed smoothly, so that the customer will complain poor product consistency. Moreover, when the burrs are removed manually, some of the burrs may be missing when removing so that the burrs remain, resulting in the unqualified appearance after coating and the corrosion caused by the incomplete coverage of a paint film. Based on the current situation, this application provides a device for automatically removing burrs from a wheel riser.

SUMMARY OF THE INVENTION

The object of the present application is to provide a device for automatically removing burrs from the edge of a wheel riser, which solves the problem of inconsistency of the riser after burr removal of a wheel, improves the effect of removing burrs from the edge of the riser, improves the efficiency of removing burrs and reduces the risk of riser corrosion. The device is simple, flexible and efficient, and can operate automatically and continuously.

In order to achieve the above object, the technical solution of the present application is: a device for automatically removing burrs from a wheel riser is composed of a frame, a clamping gear rack structure, a support plate, a servo motor, four second guide rails, a first sliding plate, a clamping cylinder, four shafts, four clamping wheels, a first deburring tool, two ranging sensors, a feed gear rack structure, a first sliding block, a movable support plate, two guide pillars, a feed cylinder, a second sliding block, two first guide rails, a cylinder support plate, a distance adjusting cylinder, a second deburring tool and a second sliding plate.

The support plate is fixed on the frame, the second guide rails are mounted on the support plate, the first sliding plate is connected with the second sliding plate by the clamping gear rack structure, the servo motor is connected with one of the clamping wheels through one of the shafts, the clamping cylinder is connected with the first sliding plate, and the servo motor is mounted on the first sliding plate. When the clamping cylinder drives the first sliding plate to move, the second sliding plate moves synchronously with the first sliding plate under the action of the clamping gear rack structure to control the clamping wheels to center and clamp a wheel. The servo motor controls the rotation of the clamping wheels, so that the wheel may rotate while being clamped.

Two guide pillars are bilaterally symmetrically mounted at upper part of the frame, the feed cylinder is mounted in upper center of the frame, output end of the feed cylinder is connected to the movable support plate, the first guide rails are mounted on the movable support plate, the first sliding block is connected with the second sliding block by the feed gear rack structure, the first deburring tool is fixed on the first sliding block, and the second deburring tool is fixed on the second sliding block, one of the ranging sensors is mounted on the first deburring tool and another ranging sensor is mounted on the second deburring tool, the cylinder support plate is fixed on the movable support plate, the distance adjusting cylinder is mounted on the cylinder support plate, and output end of the distance adjusting cylinder is connected to the second sliding block. When the distance adjusting cylinder drives the right sliding block to move, the first sliding block and the second sliding block move synchronously under the action of the feed gear rack structure, so that the first deburring tool and the second deburring tool move synchronously to adjust the distance between them according to the diameter of a cap slot. Under the guidance of the guide pillars, the feed cylinder controls the movable support plate to move up and down so as to realize feeding and resetting of the first deburring tool and the second deburring tool. The two ranging sensors respectively measure the distance from the first deburring tool to the burrs of the riser and the distance from the second deburring tool to the burrs of the riser, an average value is taken and then a signal is fed back to the feed cylinder to determine the exact descending distances of the first deburring tool and the second deburring tool, and the burrs are accurately removed by cooperation of the rotating wheel, the first deburring tool and thesecond deburring tool linearly fed.

The present application can meet the requirement of automatically removing burrs from a riser in wheel line operation, and greatly improves the removal effect compared with a manual burr removal method. The device may, according to the deformation of the riser of each wheel, correspondingly adjust the feed distance of the first deburring tool and the second deburring tool, thereby greatly improving the consistency of products. By adopting the device to remove burrs, the fillets at the edge of the riser are smooth and uniform, which solves the problem of inconsistency of the riser after the burrs are removed from the wheel.

Figure 1:
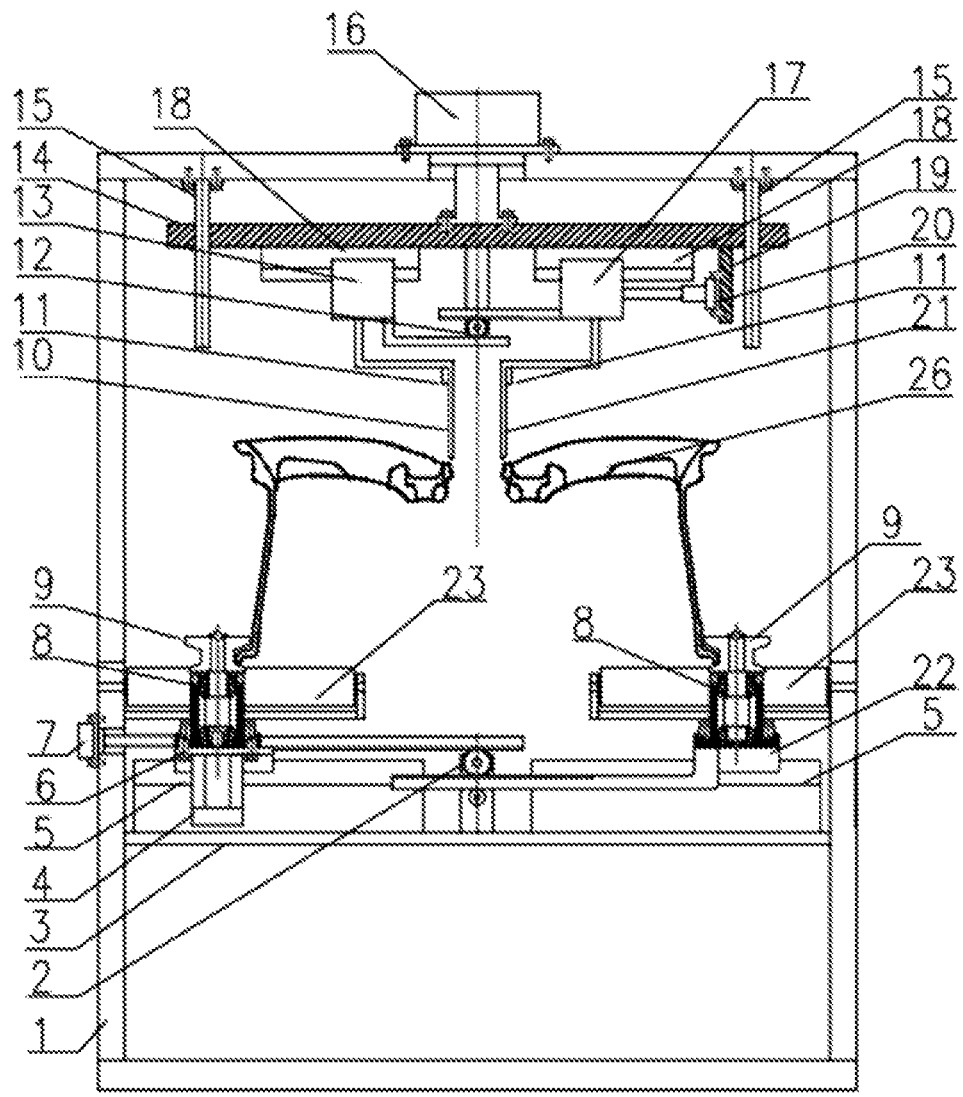
FIG. 1 is a front view of a device for automatically removing burrs from a wheel riser.
Figure 2:
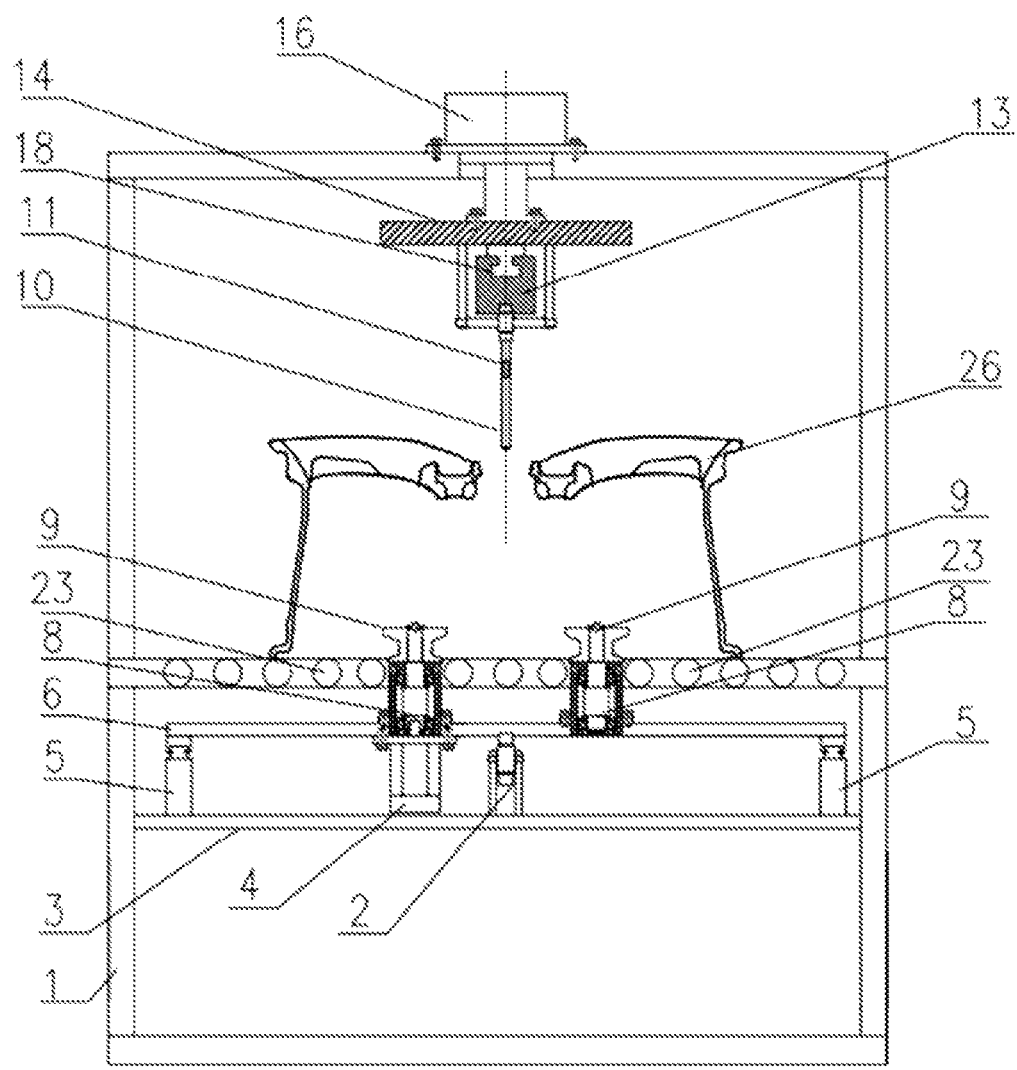
FIG. 2 is a left view of the device for automatically removing burrs from the wheel riser.
Figure 3:
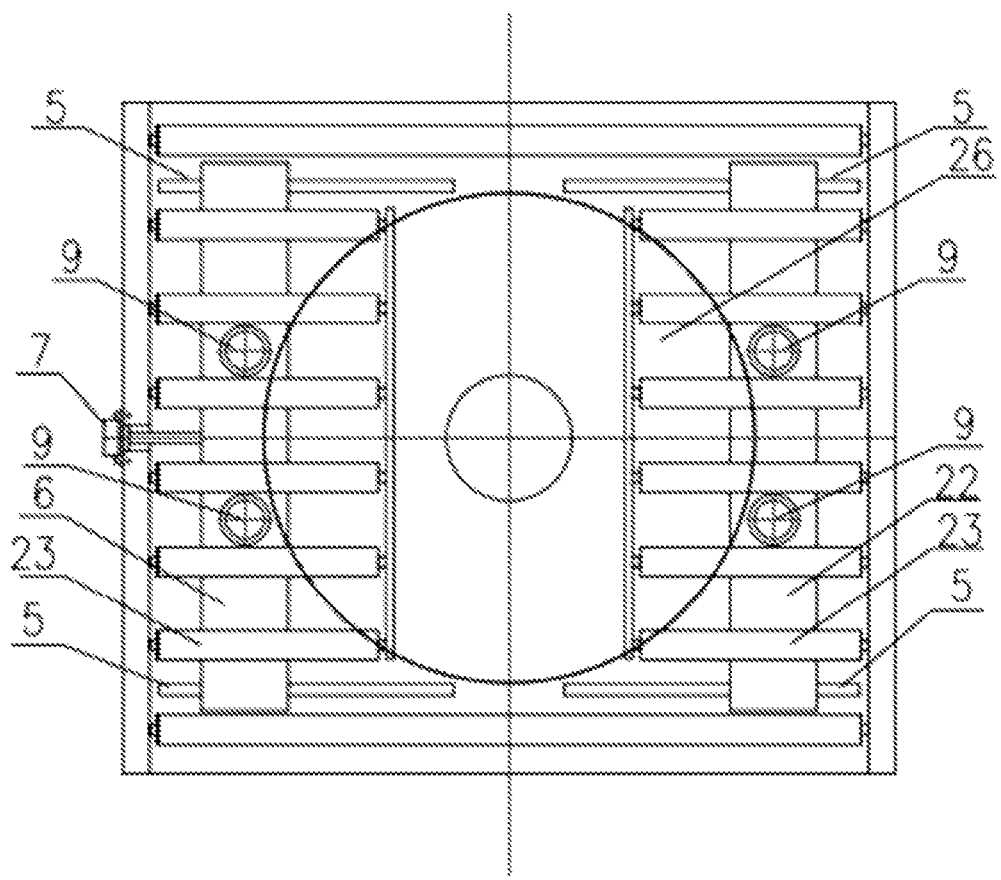
FIG. 3 is a top view of the device for automatically removing burrs from the wheel riser.
Figure 4:
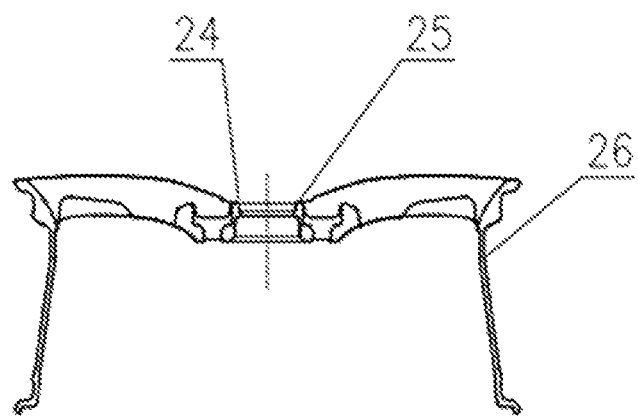
FIG. 4 is a front view of the wheel.

In which, 1-frame, 2-clamping gear rack structure, 3-support plate, 4-servo motor, 5-second guide rails, 6-first sliding plate, 7-clamping cylinder, 8-shafts, 9-clamping wheels, 10-first deburring tool, 11-ranging sensors, 12-feed gear rack structure, 13-first sliding block, 14-movable support plate, 15-guide pillars, 16-feed cylinder, 17-second sliding block, 18-first guide rails, 19-cylinder support plate, 20-distance adjusting cylinder, 21-second deburring tool, 22-second sliding plate 23-roller beds, 24-cap slot, 25-riser, 26-wheel.

DETAILED DESCRIPTION OF THE INVENTION

The details and working conditions of the specific device proposed by the present application will be described below in combination with the accompanying drawings.

A device for automatically removing burrs from a wheel riser is composed of a frame 1, a clamping gear rack structure 2, a support plate 3, a servo motor 4, second guide rails 5, a first sliding plate 6, a clamping cylinder 7, shafts 8, clamping wheels 9, a first deburring tool 10, ranging sensors 11, a feed gear rack structure 12, a first sliding block 13, a movable support plate 14, guide pillars 15, a feed cylinder 16, a second sliding block 17, upper guide rails 18, a cylinder support plate 19, a distance adjusting cylinder 20, a second deburring tool 21 and a second sliding plate 22.

The support plate 3 is fixed on the frame 1, the second guide rails 5 are mounted on the support plate 3, the first sliding plate 6 is connected with the second sliding plate 22 by the clamping gear rack structure 2, the servo motor 4 is connected with one of the clamping wheels 9 through one of the shafts 8, the clamping cylinder 7 is connected with the first sliding plate 6, and the servo motor 4 is mounted on the first sliding plate 6. When the clamping cylinder 7 drives the first sliding plate 6 to move, the second sliding plate 22 moves synchronously with the first sliding plate 6 under the action of the clamping gear rack structure 2 to control the clamping wheels 9 to center and clamp a wheel 26. The servo motor 4 controls the rotation of the clamping wheels 9, so that the wheel 26 may rotate while being clamped.

Two guide pillars 15 are bilaterally symmetrically mounted at upper part of the frame 1, the feed cylinder 16 is mounted in upper center of the frame 1, output end of the feed cylinder 16 is connected to the movable support plate 14, the first guide rails 18 are mounted on the movable support plate 14, the first sliding block 13 is connected with the right sliding block 17 by the feed gear rack structure 12, the first deburring tool 10 is fixed on the first sliding block 13, and the second deburring tool 21 is fixed on the second sliding block 17, one of the ranging sensors 11 is mounted on the first deburring tool 10 and the other of the ranging sensors 11 is mounted on the second deburring tool 21, the cylinder support plate 19 is fixed on the movable support plate 14, the distance adjusting cylinder 20 is mounted on the cylinder support plate 19, and output end of the distance adjusting cylinder 20 is connected to the second sliding block 17. When the distance adjusting cylinder 20 drives the second sliding block 17 to move, the first sliding block 13 and the second sliding block 17 move synchronously under the action of the feed gear rack structure 12, so that the first deburring tool 10 and the second deburring tool 21 move synchronously to adjust the distance between them according to the diameter of a cap slot 24. Under the guidance of the guide pillars 15, the feed cylinder 16 controls the movable support plate 14 to move up and down so as to realize feeding and resetting of the first deburring tool 10 and the second deburring tool 21. The two ranging sensors 11 measure the distances from the first deburring tool 10 and the second deburring tool 21 to the burrs of the riser 25, an average value is taken and then a signal is fed back to the feed cylinder 16 to determine the exact descending distances of the first deburring tool 10 and the second deburring tool 21, and the burrs are accurately removed by cooperation of the rotating wheel 26, the first deburring tool 10 and the second deburring tool 21 linearly fed.

During operation, firstly, the distance between the first deburring tool 10 and the second deburring tool 21 is adjusted according to the diameter of a cap slot 24 of a wheel 26 produced on an automatic line, that is, the distance adjusting cylinder is started, and the distance between the first deburring tool 10 and the second deburring tool 21 may be adjusted under the action of the feed gear rack structure 12, so that the distance between the first deburring tool 10 and the second deburring tool 21 is matched with the diameter of the cap slot 24 of the produced wheel 26; when the wheel 26 reaches a position below the device along a set of roller beds 23 (including two roller beds), the set of roller beds 23 stops rotating, and then the clamping cylinder 7 is started to center and clamp the wheel 26; next, the ranging sensors 11 measure the distances from the first deburring tool 10 and the second deburring tool 21 to the edge of the riser 25 and feed the measurement results back to the feed cylinder 16, the feed cylinder 16 accurately descends for feeding, at the same time, the servo motor 4 drives the clamping wheels to rotate so as to drive the hub to rotate, and the first deburring tool 10 and the second deburring tool 21 remove burrs when contacting the rotating wheel 26; and finally, the first deburring tool 10 and the second deburring tool 21 ascend to reset, the clamping wheels stops rotating and releases the hub set of, the roller beds 23 rotates away the hub from which the burrs have been removed, and receives next hub to be deburred, and so on.

The present application may meet the requirement for automatically removing burrs from a riser in wheel line operation, and greatly improves the removal effect compared with a manual burr removal method. The device may, according to the deformation of the riser of each wheel, correspondingly adjust the feed distance of the first deburring tool 10 and the second deburring tool 21, thereby greatly improving the consistency of products. By adopting the device to remove burrs, the fillets at the edge of the riser are smooth and uniform, which solves the problem of inconsistency of the riser after the burrs are removed from the wheel.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A device for automatically removing burrs from a wheel riser, comprises a frame, a clamping gear rack structure, a support plate, a servo motor, four second guide rails, a first sliding plate, a clamping cylinder, four shafts, four clamping wheels, a first deburring tool, two ranging sensors, a feed gear rack structure, a first sliding block, a movable support plate, two guide pillars, a feed cylinder, a second sliding block, two first guide rails, a cylinder support plate, a distance adjusting cylinder, a second deburring tool and a second sliding plate, wherein, two guide pillars are bilaterally symmetrically mounted at upper part of the frame, the feed cylinder is mounted in upper center of the frame, an output end of the feed cylinder is connected to the movable support plate, the first guide rails are mounted on the movable support plate, the first sliding block is connected with the second sliding block by the feed gear rack structure, the first deburring tool is fixed on the first sliding block, and the second deburring tool is fixed on the second sliding block, one of the ranging sensors is mounted on the first deburring tool and the other of the ranging sensors is mounted on the second deburring tool, the cylinder support plate is fixed on the movable support plate, the distance adjusting cylinder is mounted on the cylinder support plate, and an output end of the distance adjusting cylinder is connected to the second sliding block;

the support plate is fixed on the frame, the second guide rails are mounted on the support plate, the first sliding plate is connected with the second sliding plate by the clamping gear rack structure the servo motor is connected with one of the clamping wheels through one of the shafts, the clamping cylinder is connected with the first sliding plate, and the servo motor is mounted on the first sliding plate; when the clamping cylinder drives the first sliding plate to move, the second sliding plate moves synchronously with the first sliding plate 6 under the action of the clamping gear rack structure to control the clamping wheels to center and clamp a wheel;

when the distance adjusting cylinder drives the second sliding block to move, the first sliding block and the second sliding block move synchronously under the action of the feed gear rack structure, so that the first deburring tool and the second deburring tool move synchronously to adjust the distance between them according to the diameter of a cap slot; under the guidance of the guide pillars the feed cylinder controls the movable support plate to move up and down so as to realize feeding and resetting of the first deburring tool and the second deburring tool; the two ranging sensors measure the distances from the first deburring tool and the second deburring tool to the burrs of the riser, an average value is taken and then a signal is fed back to the feed cylinder to determine the exact descending distances of the first deburring tool and the second deburring tool, and the burrs are removed by cooperation of the rotating wheel, the first deburring tool and the second deburring tool linearly fed.

* * * * *